United States Patent
Haimer et al.

(10) Patent No.: US 6,796,050 B2
(45) Date of Patent: Sep. 28, 2004

(54) PRESETTING DEVICE FOR A SHRINK-FIT TOOL HOLDER

(75) Inventors: Franz Haimer, Igenhausen (DE); Josef Haimer, Igenhausen (DE); Wolfgang Kügle, Aichach-Griesbeckerzell (DE)

(73) Assignee: Franz Haimer GmbH, Hollenbach-Igenhausen (DE)

( * ) Notice: Subject to any disclaimer, the term of this patent is extended or adjusted under 35 U.S.C. 154(b) by 36 days.

(21) Appl. No.: 10/384,400

(22) Filed: Mar. 7, 2003

(65) Prior Publication Data

US 2004/0080089 A1 Apr. 29, 2004

(30) Foreign Application Priority Data

Mar. 8, 2002 (DE) .................................... 202 03 783 U

(51) Int. Cl.[7] .............................................. B23B 49/00
(52) U.S. Cl. ............................. 33/636; 33/628; 33/639; 33/545; 33/555
(58) Field of Search .......................... 33/702, 613, 628, 33/639, 636–637, 545, 548, 549, 555

(56) References Cited

U.S. PATENT DOCUMENTS

| | | | | |
|---|---|---|---|---|
| 3,518,769 A | * | 7/1970 | Bullard | 33/636 |
| 3,781,999 A | * | 1/1974 | Colangelo | 33/641 |
| 3,888,015 A | * | 6/1975 | Williams | 33/639 |
| 4,240,207 A | * | 12/1980 | Benjamin et al. | 33/639 |
| 5,036,596 A | * | 8/1991 | Gyoury et al. | 33/636 |
| 2003/0057202 A1 | * | 3/2003 | Maxson | 219/635 |

FOREIGN PATENT DOCUMENTS

| | | |
|---|---|---|
| EP | 1 155 765 A1 | 4/2001 |
| WO | WO 01/89758 A1 | 11/2001 |

* cited by examiner

Primary Examiner—Christopher W. Fulton
Assistant Examiner—Yaritza Guadalupe
(74) Attorney, Agent, or Firm—Scott D. Wofsy; Edwards & Angell, LLP

(57) ABSTRACT

A presetting device is proposed for a tool holder (1) which holds the shank (23) of a rotary tool (3) in an interference fit in a locating opening (5) and releases said shank (23) during heating, in particular by means of an induction heating arrangement (7), and which has inside the locating opening (5) an axially adjustable positioning stop surface (21) for the tool shank (23). The presetting device comprises a holder receptacle (11), which holds the tool holder (1) in an axial position and has an opposing reference surface (25), and means (43) for measuring the axial overall length of the rotary tool (3). The presetting device also comprises a measuring device (27) which measures the axial distance between the positioning stop surface (21) of the tool holder (1) and the opposing reference surface (25) of the holder receptacle (11) and has a measured-value indicator (55), the indicated distance value of which can be increased by the measured value of the overall length of the rotary tool (3).

15 Claims, 4 Drawing Sheets

PRESETTING DEVICE FOR A SHRINK-FIT TOOL HOLDER

The invention relates to a presetting device for a tool holder which holds the shank of a rotary tool, in particular of a milling or drilling tool, in an interference fit in a locating opening and releases said shank during heating, in particular by means of an induction heating arrangement.

It is known from WO 01/89758 A1 to hold rotary tools, such as, for example, milling cutters or drills, in a central locating opening of a tool holder exclusively by an interference fit of a sleeve part, forming the locating opening, of the tool holder. The sleeve part of the tool holder, by means of an induction heating arrangement, for example in the form an alternating-current-fed induction coil enclosing the sleeve part, can be heated to such an extent that the shank of the rotary tool can be inserted into the locating opening or removed from it again. The outside diameter of the shank is slightly larger than the nominal inside diameter of the locating opening, so that, when the sleeve part has cooled down, the latter holds the shank in an interference fit.

Conventional tool holders of the above type have a standard coupling, for example a steep-angle-taper coupling or an HSK coupling, by means of which the tool holder is coupled to the spindle of the production machine. In this case, a reference stop surface permits reproducible measuring of the axial position of the rotary tool relative to the spindle or to the tool holder by means of a conventional length-measuring device measuring the distance between a reference stop surface of the spindle or the tool holder and the tip of the rotary tool and thus permits reproducible axial positioning of the tool holder relative to the spindle.

Furthermore, it is known to arrange an axially adjustable positioning stop surface for the tool shank in the locating opening of shrink-fit tool holders of the type explained above. Such a positioning stop surface can be realized, for example, by a screw which projects axially into the locating opening and limits the plunge-in depth of the tool shank in an adjustable manner during the shrink fitting.

Although machine tools permit the subsequent adaptation of the machine setting to the length of the tool-holder/rotary-tool unit, it has nonetheless proved to be advantageous if the rotary tool can be shrunk in a defined axial position relative to the tool holder, in particular a reference stop surface of the tool holder, by presetting the positioning stop surface of the tool holder. Since the period during which these elements are heated is kept as short as possible in order to avoid thermal damage to the tool holder or to the rotary tool, it is desirable for the tool holder not to be adjusted during its heating phase but for it to be adjusted before the shrink-fit operation in such a way that it holds the rotary tool in a predetermined position after the shrink fitting. In addition, the presetting of the positioning stop surface is more accurate when the tool holder is still cold, since no thermal expansions of the tool holder affect the measuring result.

It is the object of the invention to provide a device by means of which axially adjustable shrink-fit tool holders can be preset in the cold state quickly and precisely in such a way that the unit of tool holder and rotary tool has a predetermined axial length after the shrink-fit operation.

In the solution achieving this object, the invention is based on a presetting device for a tool holder which holds the shank of a rotary tool, in particular of a milling or drilling tool, in an interference fit in a locating opening and releases said shank during heating, in particular by means of an induction heating arrangement, and which has inside the locating opening an axially adjustable positioning stop surface for the tool shank. The improvement according to the invention is characterized by the following features:

a) a holder receptacle which holds the tool holder in an axial position and defines an axial opposing reference surface, b) means for measuring the axial overall length of the rotary tool, and c) a measuring device which measures the axial distance between the positioning stop surface of the tool holder and the opposing reference surface of the holder receptacle and has a measured-value indicator, the indicated distance value of which can be increased by the measured value of the overall length of the rotary tool.

Such a presetting device, at its measured-value indicator, directly indicates the value of interest in practice between the tip of the rotary tool and a predetermined reproducible position in a holder receptacle. During the presetting measurement, the tool holder sits in a holder receptacle of the presetting device in a manner compatible with practice, and it is sufficient for the length adjustment if the positioning stop surface is adjusted while its distance from the opposing reference surface of the holder receptacle is measured. The presetting device may be separate from the shrink-fitting apparatus inductively heating the tool holder, but preferably forms a construction unit with the shrink-fitting apparatus, in particular when the shrink-fitting apparatus comprises a rotary table on which the tool holder sitting in the holder receptacle is transported successively through a presetting station, in which it is adjusted for the predetermined length, a shrink-fitting station, in which the rotary tool is inserted, and if need be a cooling station, in which the tool holder with rotary tool shrunk in place is cooled again to room temperature.

In a preferred configuration which can be composed of commercially available length-measuring components, provision is made for the measuring device to have a first electric position transducer, which delivers a first distance signal representing the distance between the positioning stop surface and the opposing reference surface, for the means for measuring the overall length of the rotary tool to comprise a second electric position transducer, which delivers a second distance signal representing the overall length, and for the measured-value indicator to comprise means for the summation of the first and the second distance signal and for it to indicate a value representing the sum of the distance signals. The position transducers are preferably digital position transducers, which do not even have to contain measured-value memories, since the rotary tool can remain in the measuring position of the second position transducer during the axial adjustment of the tool holder.

In a variant of the presetting device, a single electrical or mechanical length-measuring instrument is sufficient if the measuring device has two measuring probes which are guided in a displaceable manner in the axial direction of the tool holder relative to the opposing reference surface and of which a first measuring probe is intended for bearing with a measuring surface against the position stop surface of the tool holder, and the second measuring probe is intended for bearing with a measuring surface against an axial end of the rotary tool, while the rotary tool, parallel to the axial direction of the tool holder, bears with its other axial end either on a reference surface of the first measuring probe or on the opposing reference surface, the measuring device measuring the distance between the measuring surfaces of the two measuring probes, and it being possible for the measured-value indicator to be set to zero value indication when the first measuring probe bears on the opposing reference surface and the second measuring probe bears on the reference surface of the first measuring probe or on the rotary tool, respectively. A presetting device of this type, which can in turn be combined with the shrink-fitting apparatus to form a construction unit, provides for a mechanical sum operation, so that here, too, the measured-value indication indicates the sum value of interest in practice.

In order to simplify the manipulation, the first measuring probe and the second measuring probe are expediently guided in a displaceable manner independently of one another on a stationary guide column perpendicular to the opposing reference surface, the reference surface on which the rotary tool is to be put for the presetting operation being expediently arranged on the top side of the first measuring probe in the displacement path of the second measuring probe.

Alternatively, the first measuring probe may be guided on a stationary guide column perpendicular to the opposing reference surface, the second measuring probe then being guided on the first measuring probe in a displaceable manner parallel to the displacement direction of the latter, and the opposing reference surface lying in the displacement path of the second measuring probe. In this variant, the rotary tool, for determining its length, is put on the opposing reference surface, a factor which reduces the overall height of the presetting device compared with the first-mentioned variant. In both variants, however, commercially available length-measuring instruments may be used.

Although the presetting of the tool holder could also be carried out with the axis of the tool holder arranged in a horizontal position, the tool receptacle is nonetheless preferably arranged in such a way that it accommodates the tool holder with the locating opening open at the top, since this facilitates the manipulation, in particular if the tool receptacle is already an integral part of the shrink-fitting apparatus. The measuring device expediently has an elongated measuring-probe extension which can be inserted into the locating opening from the tool-insertion side of the tool holder into the latter right up to the positioning stop surface and which is preferably in the form of a continuously open sleeve which permits the insertion of an adjusting tool for the position adjustment of a positioning element, forming the positioning stop surface, for example of a positioning screw of the tool holder. In this way, the measuring operation and the adjusting operation can be carried out from above. The adjusting tool may be separate from the measuring-probe extension. However, it may also form a unit with the measuring-probe extension, provided the measuring-probe extension is mounted on the measuring device in a rotatable manner, that is to say it is at the same time used as an adjusting tool.

In conventional rotary tools, the end face of the shank usually does not run exactly at right angles to its rotation axis. If such a rotary tool is put on a reference surface in order to measure its overall length, this leads to an incorrect measurement with regard to the position of the shank with respect to the positioning stop surface of the tool holder. In a preferred configuration of the presetting device, in which the overall length of the rotary tool is measured by means of a measuring device, provision is made for the shank of the rotary tool, during the measurement of the overall length, to be axially supported with its end face on a supporting holder, which supports the end face at a reference stop surface of a supporting projection, at which the diameter of this reference surface is smaller than the shank diameter. The diameter of the reference stop surface of the supporting projection is preferably approximately equal to the diameter of the positioning stop surface of the tool holder. The supporting projection, during the measurement of the overall length of the rotary tool, thus "simulates" the positioning stop surface, usually formed by an adjusting screw, of the tool holder. A supporting holder of the aforesaid type may also be used in presetting devices other than those explained above and thus has independent inventive significance.

The supporting holder also expediently has supporting surfaces which radially support the shank of the rotary tool at its circumference and which are in particular in the form of prismatic surfaces which center the shank. Spring-loaded pressure means are preferably assigned to the prismatic surfaces, which means clamp the shank between the prismatic surfaces.

In order to simplify the measurement of the overall length, the supporting holder, at a distance from the reference stop surface of the supporting projection, has a reference surface which is parallel to and, in particular, in alignment with the reference stop surface and is accessible for the measurement and which permits the zero setting of the measuring device with regard to the reference stop surface of the supporting projection.

The supporting holder expediently comprises several groups of supporting surfaces, in particular prismatic surfaces, in order thus to be able to measure rotary tools having shanks of differing thickness.

The invention is explained in more detail below with reference to a drawing, in which.

Figure 1:
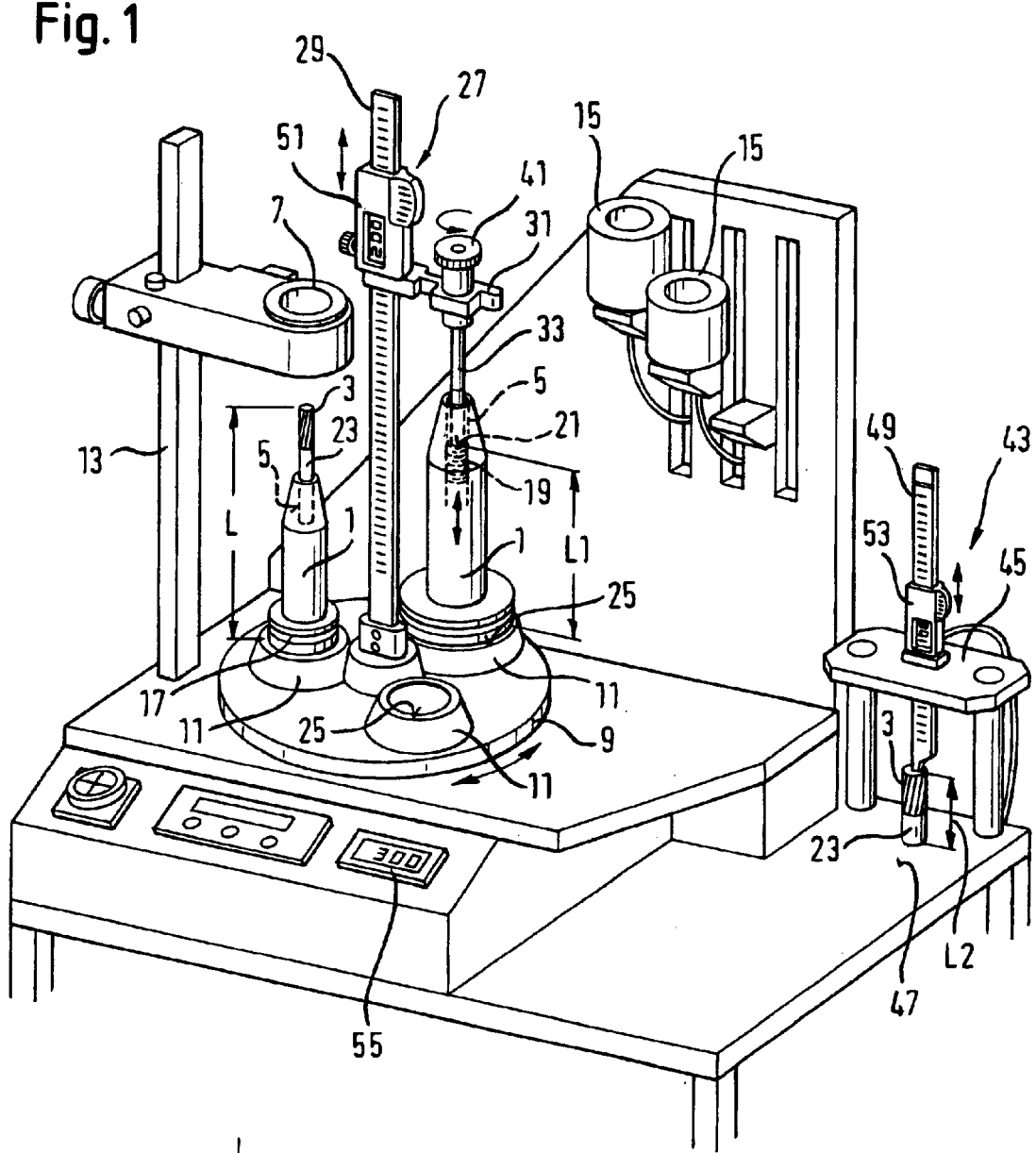
FIG. 1 shows a perspective representation of a shrink-fitting apparatus with a presetting device.

The shrink-fitting apparatus shown in FIG. 1 enables tool holders 1, which hold, for example, a drill, a milling cutter or a reaming tool in an interference fit in a central locating opening 5, to be thermally expanded by means of an alternating-current-fed induction coil 7 in such a way that the tool 3 can be inserted into the locating opening 5 or removed from it. The shrink-fitting apparatus, which is described in detail in WO 01/89758 A1, has a rotary table 9 having a plurality of holder receptacles 11 which are arranged around the rotation axis of the rotary table 9 and into which the tool holders 1 can be inserted with a vertical axis and locating opening 5 directed upward. The induction coil 7 is guided in a displaceable manner on a vertical guide 13 and, for expanding the tool holder 1, is brought into a position enclosing the latter centrally. In the thermally expanded state, the tool 3 can be inserted into or removed from the tool holder 1 from above. To cool the inductively heated tool holder 1, cooling sleeves 15, which can likewise be put onto the tool holder 1 from above, are provided on a cooling-liquid circuit. In the process, the rotary table 9 is expediently moved out of the heating position, determined by the induction coil 7, to such an extent that the cooling sleeve 15 can be put on from above without any problems.

The tool 3 is to be shrunk in place in the tool holder 1 in such a way that the tip of the tool 3 has a predetermined axial position relative to the tool holder 1. The position in this case may be defined by a reference stop surface on that side of a flange 17 of the tool holder 1 which is axially remote from the tool 3 and from which the tip of the tool 3 is to be at a predetermined distance L which is as precise as possible. The axial position may thus also be defined by the position which the tool holder 1 subsequently occupies in the spindle coupling, assigned to it, of the machine tool. In order to be able to adjust the axial position of the tool 3 relative to the tool holder 1, that is to say, for example, the distance L, the tool holder 3 [sic] contains an axially adjustable adjusting screw 19, the end face 21 of which, in the locating opening 5, forms an axially adjustable positioning stop surface for the shank 23, which can be inserted into the thermally expanded tool holder 3 [sic], of the tool 3.

Inserted into the holder receptacle 11, the tool holder 1 sits in a defined axial position relative to an opposing reference surface 25 of the holder receptacle 11 or, as in the case of tool holders of the HSK type for example, bears with the reference surface of its flange 11 [sic] against the opposing reference surface 25 of the holder receptacle 11, so that the distance L1 of the positioning stop surface 21 of the positioning screw from the opposing reference surface 25 oriented in the same direction can be measured from above. A measuring device 27 with a measuring probe 31 which is displaceable along a guide rule 29 is provided for the measurement of the distance L1. The guide rule 29 is arranged centrally in the direction of the rotation axis of the rotary table 9 and can be rotated relative to the rotary table 9. Projecting from the measuring probe 31 is an elongated probe extension 33, which, by displacement of the measuring probe 31 along the guide rule 29, can be pushed into the locating opening 5 until it runs against the positioning stop surface 21. The probe extension 33 is mounted in the measuring probe 31 in such a way as to be rotatable about its longitudinal axis and, at its end which can be inserted into the locating opening 5, carries an adjusting tool 35 (FIG. 2) which can be brought into positive-locking engagement with the positioning screw 19. The adjusting tool 35, against the pressure of a spring 37, is guided in a rotationally fixed but axially displaceable manner in the probe extension 33, so that its measuring surface 39 can be brought reliably into contact with the positioning stop surface 21. At the opposite end, the probe extension 33 is provided with a handle 41, by means of which the positioning screw 19 can be turned, while the measuring surface 39 bears against the positioning stop surface 21.

The predetermined length L between the tip of the tool 3 and the opposing reference surface 25 of the holder receptacle 11 is the sum of the distance L1 between the positioning stop surface 21 and the opposing reference surface 25 of the holder receptacle 11 and the overall length L2 of the rotary tool 3. The overall length L2 of the tool 3 is measured by means of a second measuring device 43. In the exemplary embodiment, the measuring device 43 has a table 45, under which the tool 3 is set up with its shank vertically downward on a reference surface 47, and a vertically displaceable rule 49, which is placed against the tip of the tool 3.

Each of the two measuring devices 27 and 43 has an electric, for example digital, position transducer 51 or 53, respectively, which can be reset on its own in a manner still to be explained in more detail below. A summing indicator 55 indicates the sum of the position signals emitted by the position transducers 51, 53.

For the presetting of the tool holder 1 to a predetermined length value L, first of all the measuring probe 31 with its probe extension 33 is put on the opposing reference surface 25 of the holder receptacle 11 and its position transducer is set to zero. In a corresponding manner, the measuring rule 49 of the measuring device 43 is put on the reference surface 47 and the position transducer 53 is likewise set to zero. The tool 3 to be subsequently shrunk in place is then put on the reference surface 47 and the rule 49 is placed against the tool tip. After the tool holder 1 has been inserted into the holder receptacle 11, the measuring probe 31 is displaced until the measuring surface 39 of the probe extension 33 bears against the positioning stop surface 21. The indicator 55 now indicates the sum of the distances L1 and L2, and this sum can be adjusted to the desired value L by turning the handle 41, with the measuring probe 31 following up.

The tool holder 1 preset in this way is subsequently aligned with the induction coil 7 by turning the rotary table 9, and the tool 3 measured in the measuring device 43 is shrunk in place in the tool holder 1.

Figure 2:
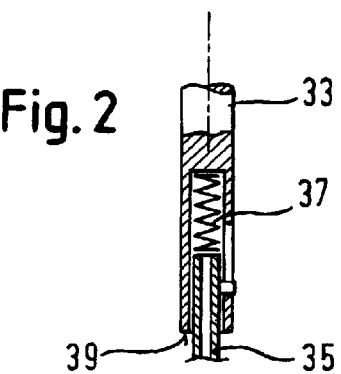
FIG. 2 shows a detailed view of an adjusting tool of the presetting device.

Variants of the presetting device explained with reference to FIGS. 1 and 2 are described below. Components having the same effect are designated with the designations in FIGS. 1 and 2 and are provided with a letter for differentiation. To explain the construction, the functioning and any possible variants, reference is made to the description of FIGS. 1 and 2.

Figure 3:
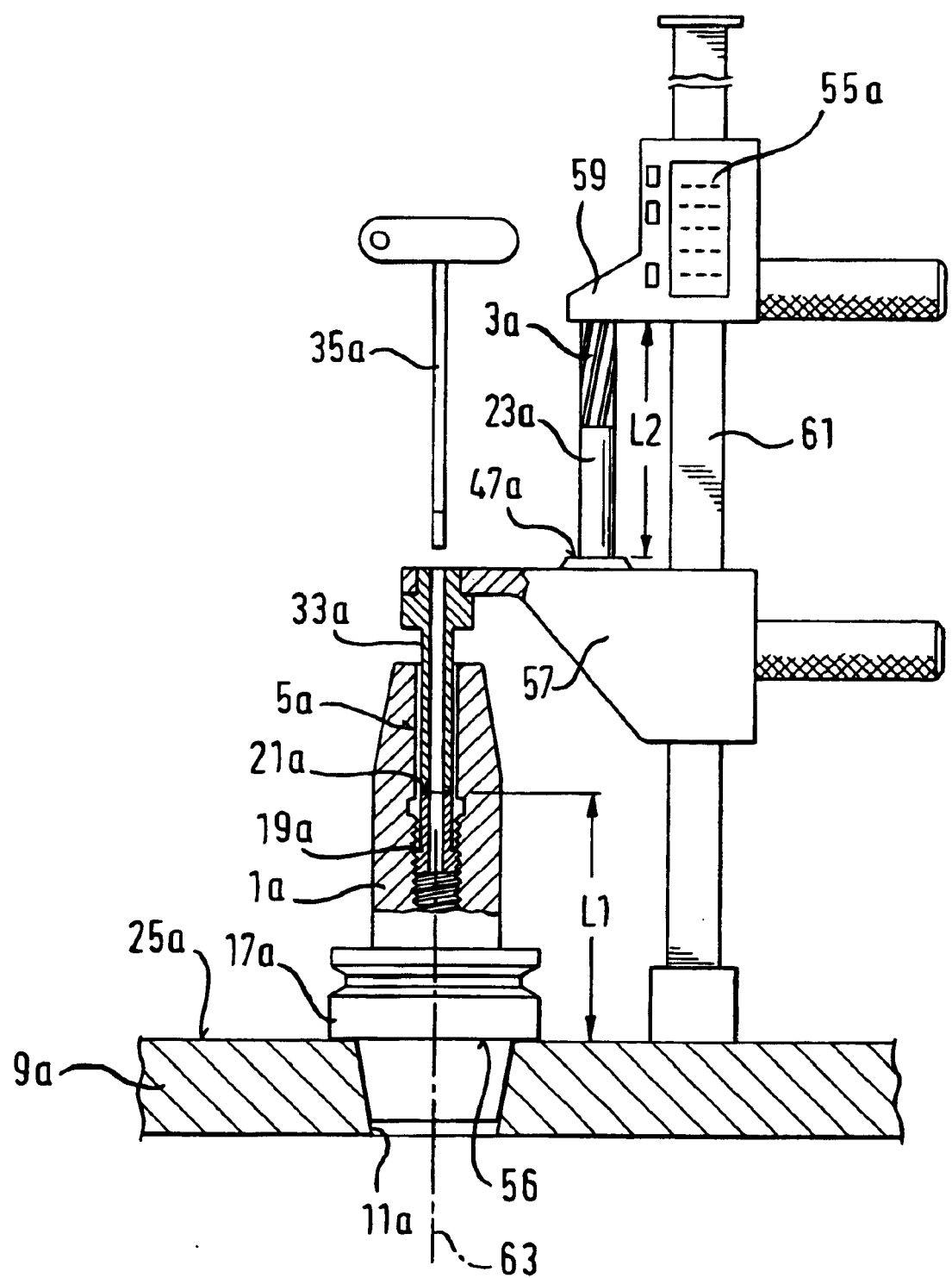
FIG. 3 shows a variant of the presetting device.

The presetting device of FIG. 3 needs only a single measuring device and provides for the summation of the lengths L1 and L2 in a mechanical manner. The presetting device can be connected to a shrink-fitting apparatus to form a construction unit and comprises a base plate 9a, which is in turn the rotary table of the shrink-fitting apparatus. The base plate 9a is provided with a holder receptacle 1a for a shrink-fit tool holder 1a, the flange 17a of which, in the example shown, bears with its reference stop surface 56 against the opposing reference surface 25a. In this case, the locating opening 5a intended for locating the rotary tool 3a is open at the top with a vertical axis. A positioning screw 19a in turn sits in the locating opening 5a and its end face 21a directed toward the locating opening 5a forms the positioning stop surface for the shank 23a of the rotary tool 3a.

The measuring device comprises two measuring probes 57 and 59, which are guided in a displaceable manner independently of one another parallel to the rotation axis 63 of the tool holder 1a on a rule guide 61 which is stationary relative to the base plate 9a. The measuring probe 57 which is at the bottom in the present case carries a probe extension 33a which is designed as a continuously open sleeve and can be inserted from above into the locating opening 5a until it comes to bear against the positioning stop surface 21a. Provided on the top side of the measuring probe 57 is a reference surface 47a which runs normal to the axis of the displacement direction of the measuring probe 57 and on which the rotary tool 3a can be placed vertically for the measurement of its overall length. The measuring probe 59 is arranged above the measuring probe 57 and can be placed against the top end of the rotary tool 3a. It comprises a mechanical or electric position transducer which can be selectively set to zero and has an indicator 55a which indicates the displacement path of the measuring probe 59 relative to the position of the zero setting of its measuring device.

To determine the the [sic] sum of the distance L1 between the opposing reference surface 25a and the positioning stop surface 21a and the overall length L2 of the rotary tool 3a, the measuring probe 57, with its probe extension 33a, is put on the opposing reference surface 25a, and the measuring probe 59 is put on the reference surface 47a. In this position, the indicator 55a is set to zero. After the probe extension 33a of the measuring probe 57 has been set down on the positioning stop surface 21a and the tool 3a has been inserted between the reference surface 47a and the measuring probe 59, the indicator 55a indicates the sum value of L1 plus L2. Through the probe extension 33a designed as a sleeve, an adjusting tool 35a can be brought from above into positive-locking engagement with the positioning screw 19a, so that the desired value L can be set by turning the positioning screw 19a and by follow-up of the measuring probes 57, 59.

The probe extension 33a is interchangeably held on the measuring probe 57, so that a suitable extension from a set of such extensions can be selected for adaptation to tool holders of differing size. It goes without saying that the extension 33 in the variant in FIG. 1 may also be designed to be interchangeable. As an alternative to the telescopic adjusting tool shown in FIG. 2, the probe extension 33 in the device in FIG. 1 may also be designed as a sleeve, through which an adjusting tool similar to the tool 35a can be inserted. In contrast thereto, a telescopic extension provided with a handle 1 [sic] may also be provided in the device in FIG. 3.

In the embodiment in FIG. 3, the rule at the same time forms the guide for the measuring probes 57, 59. In order to increase the mechanical stability, an additional guide rail may be provided for the measuring probes 57, 59 in addition to the rule.

Figure 4:
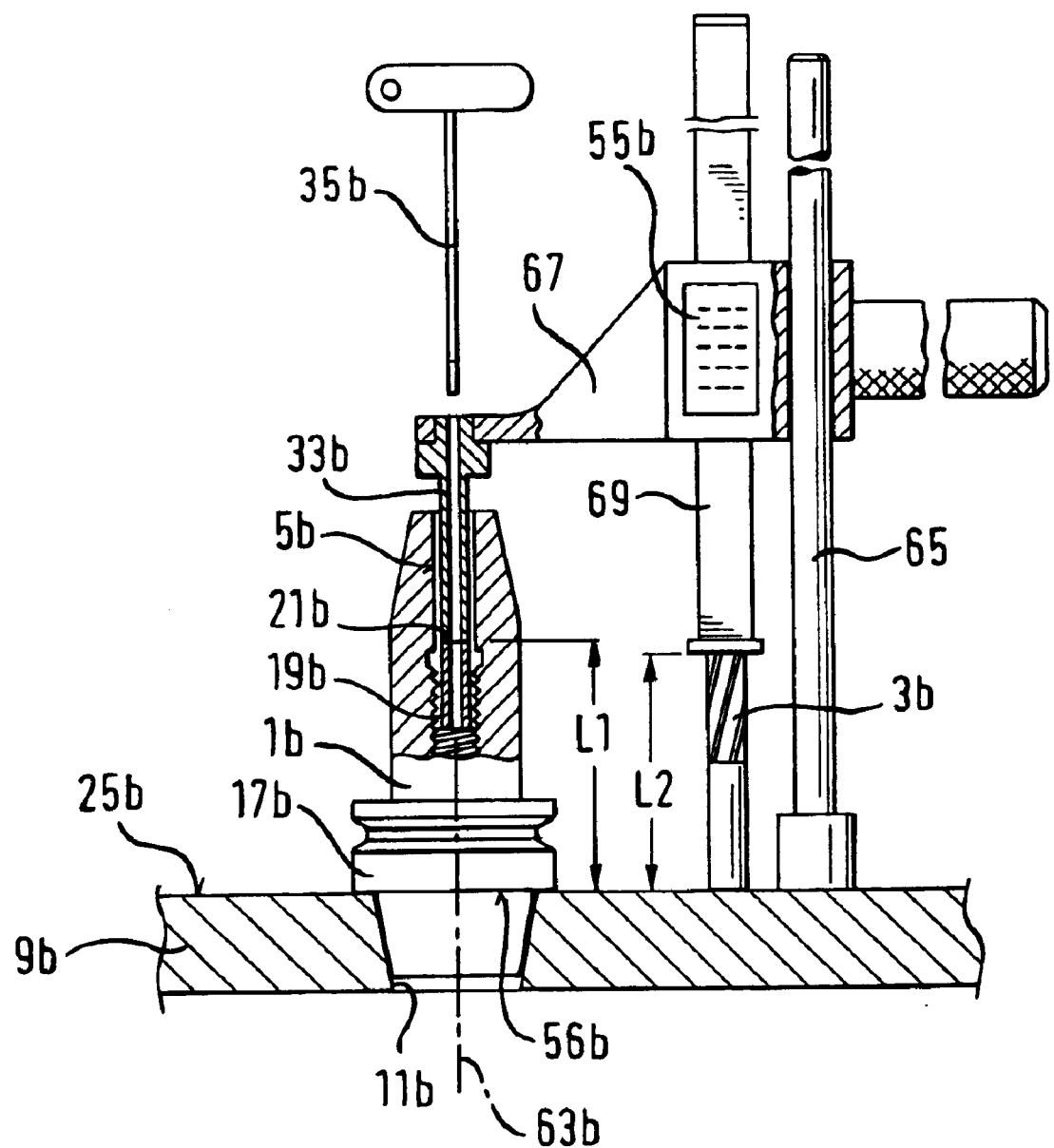
FIG. 4 shows a further variant of the presetting device.

In the embodiment in FIG. 3, the measuring probes 57, 59 are arranged one above the other, which may possibly lead to a comparatively large overall height of the device. FIG. 4 shows a variant which permits a reduction in the overall height with comparatively little design input. The device according to FIG. 4 differs from the device from FIG. 3 primarily in the configuration of the measuring device. The components for accommodating the tool holder 1b and of the tool holder 1b as such correspond to the device from FIG. 3. For an explanation, reference is made to FIG. 3.

The measuring device comprises a measuring probe 67 which is guided in a displaceable manner on a guide column 65 which is stationary relative to the base plate 9b and extends in the direction of the rotation axis 63b of the tool holder 1b and which, with a probe extension 33b designed as a sleeve, can be inserted into the locating opening 5b of the tool holder 1b right up to the positioning stop surface 21b of the positioning screw 19b. A second measuring probe in the form of a rule 69 is guided on the measuring probe 67 in a displaceable manner parallel to the guide column 65. Furthermore, the measuring probe 67 carries a mechanical or electric position transducer which can be set to zero in a selectable relative position of the two measuring probes 67, 69 and to which an indicator 55b is assigned, this indicator 55b indicating the difference in position between the two measuring probes 67, 69 relative to the position at zero setting.

To measure and set the desired length L, first of all the tool 3b is inserted between the measuring probe 69 and the reference surface 25b, and the probe extension 33b of the measuring probe 67 is placed on the reference surface 25b. After the measured-value indicator 55b has been set to zero, the tool 3b is removed, the probe extension 33b is put down on the positioning stop surface 21b of the tool holder 1b, and the measuring probe 69 is displaced until it bears against the reference surface 25b. The measured-value indicator 55b now shows the sum of the distances L1 and L2, so that the desired distance L can be set by means of the adjusting tool 35b with the measuring probes 67, 69 following up.

Figure 5:
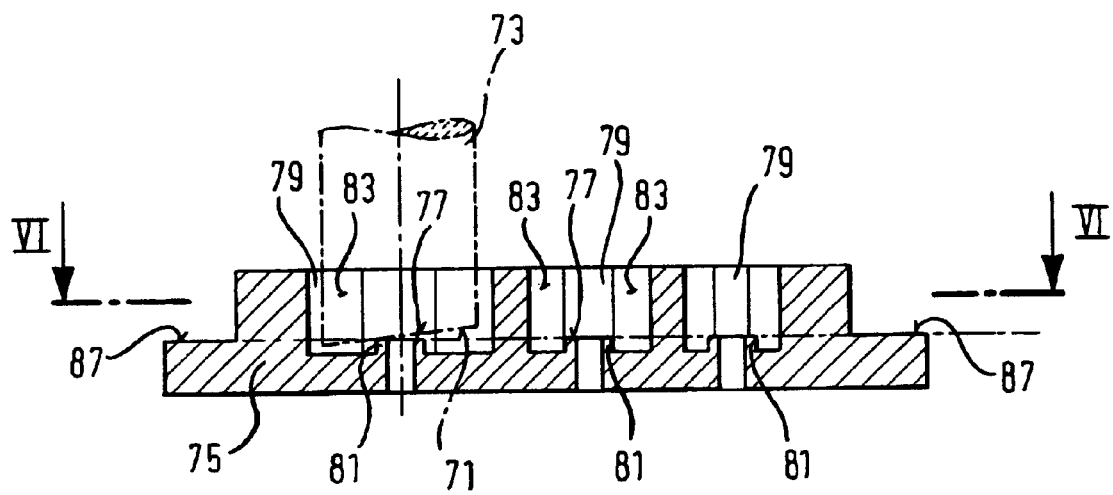
FIG. 5 shows a sectional view of a supporting holder increasing the measuring accuracy during the measurement of the overall length of a rotary tool, as viewed along line V—V in FIG. 6.
Figure 6:
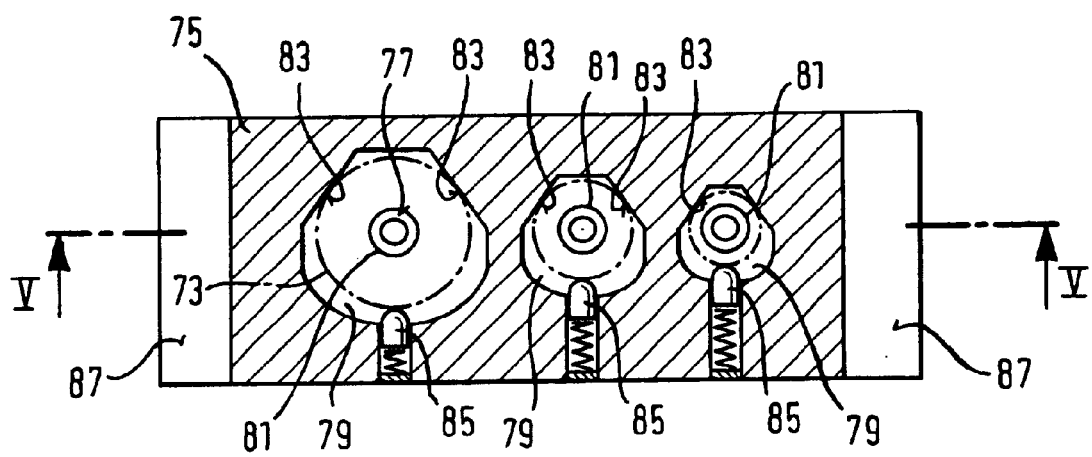
FIG. 6 shows a sectional view of the supporting holder as viewed along line VI—VI in FIG. 5.

As a rule, the end face of the shank of conventional rotary tools does not run exactly normal to the rotation axis of the tool but is slightly inclined on account of production tolerances. If such a tool, for the measurement of its length, is put down on a flat reference surface with the front end of its shank, this leads to a measuring error if the diameter, determined by the diameter of the positioning screw of the tool holder, of the positioning stop surface is smaller than the shank diameter of the tool. Measuring errors of this type can be avoided or at least reduced if the tool, as shown in FIGS. 5 and 6, for the measurement of its length, is put down with the front end 71 of its tool shank 73 on a supporting holder 75 which limits the reference surface 77, intended for seating the front end 71, to the diameter of the positioning stop surface, provided in the associated tool holder, of the positioning screw. To this end, the supporting holder 75 has one or more recesses 79, from the base of which a supporting projection 81 ending in the reference surface 77 protrudes in each case. The recesses 79 are provided with prismatic surfaces 83 which support the shank 73 of the tool essentially in a central position with the axis perpendicular to the reference surface 77. Provided opposite the prismatic surfaces 83 is a spring-loaded pressure element 85 which clamps the shank 73 against the prismatic surfaces 83. Provided outside the recess 79 on the supporting shoulder 75 is at least one reference surface 87 which runs in the plane of the reference surface 77 of the supporting projection 81 and against which a measuring probe of the measuring device can be placed for zero-setting purposes.

As FIGS. 5 and 6 show, the supporting holder 75 comprises a plurality of such recesses 79 provided with a supporting projection 81, with prismatic surfaces 83 and with pressure elements 85, the dimensions of these recesses 79 being adapted to different shank diameters of tools. Supporting holders of the type explained in FIGS. 5 and 6 can be used in each of the presetting devices explained above.

What is claimed is:

1. Presetting device for a tool holder (1) which holds the shank of a rotary tool, in particular of a milling or drilling tool, in an interference fit in a locating opening (5) and releases said shank during heating, in particular by means of an induction heating arrangement (7), and which has inside the locating opening (5) an axially adjustable position stop surface (21) for the tool shank (23), comprising:
   a) a holder receptacle (11) which holds the tool holder (1) in an axial position and defines an axial opposing reference surface;
   b) means (43; 59; 69) for measuring the axial overall length (L2) of the rotary tool (3); and
   c) a measuring device (27) which measures the axial distance (L1) between the positioning stop surface (21) of the tool holder (1) and the opposing reference surface (25) of the holder receptacle (11) and has a measured-value indicator (55), the indicated distance value of which can be increased by the measured value of the overall length (L2) of the rotary tool (3).

2. Presetting device according to claim 1, wherein the measuring device (27) has a first electric position transducer (51), which delivers a first distance signal representing the distance between the position stop surface (21) and the opposing reference surface (25), wherein the means (43) for measuring the overall length of the rotary tool (3) includes a second electric position transducer (53), which delivers a second distance signal representing the overall length (L2), and wherein the measured-value indicator (55) includes means for the summation of the first and the second distance signal and indicates a value representing the sum of the distance signals.

3. Presetting device according to claim 1, wherein the measuring device has two measuring probes (57, 59; 67; 69) which are guided in a displaceable manner in the axial direction of the tool holder (1a, b) relative to the opposing reference surface (25a, b) and of which a first measuring probe (57; 67) is intended for bearing with a measuring surface against the position stop surface (21a, b) of the tool holder (1a, b), and the second measuring probe (59; 69) is intended for bearing with a measuring surface against an axial end of the rotary tool (3a, b), while the rotary tool (3a, b), parallel to the axial direction of the tool holder (1a, b), bears with its other axial end either on a reference surface (47a) of the first measuring probe (57) or on the opposing reference surface (25b), and wherein the measuring device measures the distance between the measuring surfaces of the two measuring probes (57, 59; 67, 69), and the measured-value indicator (55a, b) can be set to zero value indication when the first measuring probe (57; 67) bears on the opposing reference surface (25a, b) and the second measuring probe (59; 69) bears on the reference surface (47a) of the first measuring probe (57) or on the rotary tool (3b), respectively.

4. Presetting device according to claim 3, wherein the first measuring probe (57) and the second measuring probe (59) are guided in a displaceable manner independently of one another on a stationary guide column (61) perpendicular to the opposing reference surface (25a), and wherein the reference surface (47a) is arranged on the top side of the first measuring probe (57) in the displacement path of the second measuring probe (59).

5. Presetting device according to claim 3, wherein the first measuring probe (67) is guided on a stationary guide column (65) perpendicular to the opposing reference surface (25b), and wherein the second measuring probe (69) is guided on the first measuring probe (67) in a displaceable manner parallel to the displacement direction of the latter, the opposing reference surface (25b) lying in the displacement path of the second measuring probe (69).

6. Presetting device according to claim 1, wherein the measuring device has an elongated measuring-probe extension (33) which can be inserted into the locating opening (5) from the tool-insertion side of the tool holder (1) into the latter right up to the position stop surface (21).

7. Presetting device according to claim 6, wherein the measuring-probe extension (33a, b) is designed as a continuously open sleeve which permits the insertion of an adjusting tool (35a, b) for the position adjustment of a position element (19a, b), forming the position stop surface (21a, b), of the tool holder (1a, b).

8. Presetting device according to claim 6, wherein the measuring-probe extension (33) is mounted on the measuring device (27) in such a way as to be rotatable about its longitudinal axis and, at its end which can be inserted into the locating opening (5), carries an adjusting tool (35) for the position adjustment of a positioning element (19), forming the positioning stop surface (21), of the tool holder (1).

9. Presetting device according to claim 1, wherein the measuring device (27) is combined with an induction shrink-fitting apparatus to form a construction unit, the induction shrink-fitting apparatus, on a rotary table (9), having a plurality of holder receptacles (11) for tool holders (1) which are alternately preset or inductively heated or cooled in the holder receptacles (11).

10. Presetting device for a tool holder which holds the shank of a rotary tool, in particular of a milling or drilling tool, in an interference fit in a locating opening and releases said shank during heating, in particular by means of an induction heating arrangement and which has inside the locating opening an axially adjustable positioning stop surface for the tool shank, according to claim 1, including a measuring device comprising means for measuring the axial overall length of the rotary tool and having a supporting holder (75) which supports the shank (73) of the rotary tool axially at its end face (71) during the measurement of the overall length, the supporting holder (75), for supporting the end face (71) of the shank (73), having a supporting projection (81) which ends in a reference stop surface (77) having a smaller diameter than the shank diameter.

11. Presetting device according to claim 10, wherein the reference stop surface (77) has essentially a circular contour and its diameter is essentially dimensioned to be equal to the diameter of the reference stop surface in the locating opening of the tool holder.

12. Presetting device according to claim 10 wherein the supporting holder (75), at a distance from the reference stop surface (77) of the supporting projection (81), has a reference surface (87) which is parallel to and in alignment with the reference stop surface (77) and is accessible for the measurement.

13. Presetting device according to claim 10, wherein the supporting holder (75) has supporting surfaces (83) which radially support the shank (73) of the rotary tool at its circumference.

14. Presetting device according to claim 13, wherein the radial supporting surfaces (83) are designed as prismatic surfaces, and the supporting projection (81) is arranged in the plane of symmetry of the prismatic surfaces.

15. Presetting device according to claim 14, wherein spring-loaded pressure means (85) are assigned to the prismatic surfaces and clamp the shank (73) between the prismatic surfaces.

* * * * *